United States Patent Office 3,282,132
Patented Nov. 1, 1966

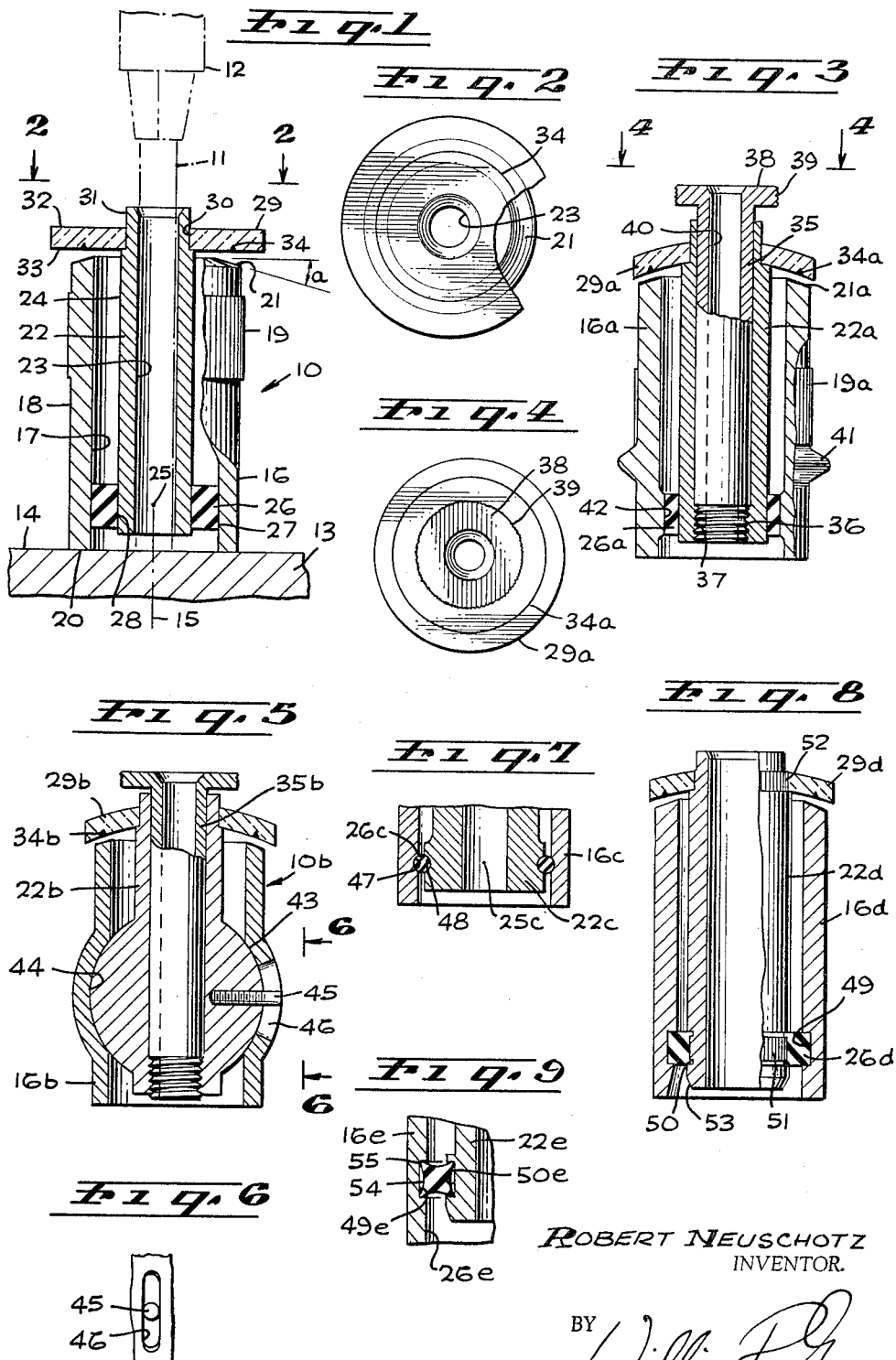

3,282,132
DRILL GUIDE
Robert Neuschotz, 1162 Angelo Drive,
Beverly Hills, Calif.
Filed Feb. 4, 1964, Ser. No. 342,375
12 Claims. (Cl. 77—55)

This invention relates to an improved type of portable drill guide attachment, for facilitating the drilling of a hole at a predetermined angle through a work piece, and preferably directly perpendicularly to the surface of the work piece.

In drilling a hole in a work piece with a portable drill, it is often extremely difficult to manually hold the drill at an accurately predeterminable angle with respect to the work piece surface, with the result that holes drilled in this manner are often inaccurately directed and irregularly shaped. The general object of the present invention is to provide a device which may be utilized with a portable drill, and will serve as a guide by which the angularity of the drill bit to the work surface may be controlled. Preferably, the guide has indicating means for apprising a user as to when the bit is in proper position for drilling, with these means acting to continuously indicate proper positioning of the bit throughout the entire drilling operation to assure that the full depth of the drilled hole is made at the same predetermined angle.

The device includes a body structure which may be placed against the work surface, to assume an orientation controlled by and in predetermined relation to the surface. Mounted to this body there is a guide element, desirably taking the form of a guide bushing through which the drill bit may pass. A particular feature of the invention resides in a unique manner of mounting this guide bushing for slight motion relative to the work engaging body, so that the vibration of the drill will not affect maintenance of the proper engagement of the body with the work. Preferably, the guide element is mounted for general pivotal or swinging movement relative to the work engaging body, and for best results is mounted to the body by a resilient connection tending to return the guide to a desired properly aligned condition. More particularly, a rubber or other elastomeric mounting part may be utilized for providing the discussed resilient connection between the guide element and work engaging body. In another form of the invention, the pivotal connection may be formed by a mechanical ball and socket joint, preferably constructed to restrain the guide bushing or element against rotation relative to the body.

The currently preferred type of indicating means for telling an operator when the guide element is in proper drilling position includes an annular marking ring carried by one of the realtively movable parts, preferably the guide tube, and coacting with an annular opposed surface or marking on the other part. More specifically, the guide tube may carry a transparent element having a ring marked thereon, and adapted to be centered with respect to an annular end surface of the work engaging body of the tool. Further, in order to adapt the tool for use with any of various different sizes of drill bits, the guide structure may include a removable bushing element, having a cylindrical passage for receiving and guiding the drill bit, and replacable by different sizes of bushings having different size inner passages.

The above and other features and objects of the invention will be better understood from the following detailed description of the typical embodiments illustrated in the accompanying drawing, in which:

FIG. 1 is an axial section taken through a first form of drill guide device constructed in accordance with the invention;

FIG. 2 is a plan view taken on line 2—2 of FIG. 1;
FIG. 3 is a view similar to FIG. 1, but showing a variational type of guide;
FIG. 4 is a plan view taken on line 4—4 of FIG. 3;
FIG. 5 is a view similar to FIG. 1, but showing another form of the invention;
FIG. 6 is a fragmentary side view taken on line 6—6 of FIG. 5;
FIG. 7 is an axial section through the lower portion of another form of the invention;
FIG. 8 is a view similar to FIG. 1, but showing another form of the invention; and
FIG. 9 is a fragmentary axial section through the lower portion of another form of the invention.

With reference first to FIGS. 1 and 2, I have shown at 10 a tool for use in guiding a drill bit 11 carried by a portable electric or pneumatic drill 12, as the bit drills a hole within a work piece 13. The work piece has a planar surface 14, and it is desired that the hole be drilled within the work piece along an axis 15 disposed perpendicularly to surface 14.

The drill guide device or drill holder 10 includes a tubular rigid body 16, typically formed of a suitable metal such as steel or aluminum, having inner and outer cylindrical surfaces 17 and 18 centered about axis 15. The outer surface 18 may have an annular series of serrations 19, typically axially extending serrations, for facilitating manual holding of body 16 by a user against work surface 14. At its axially inner end, body 16 has an annular end surface 20 which is exactly perpendicular to axis 15 if a perpendicular hole is to be drilled. The axially outer end surface 21 of body 16 is annular and disposed generally transversely of axis 15, but may be slightly frusto-conical, as shown, being disposed at a slight angle $a$ to a true transverse plane (typically 15 degrees). As viewed from the upper end of the tool holder, surface 21 appears as an annular surface centered around axis 15, as will be apparent from FIG. 2.

Within the interior of body 16, there is contained a drill guide bushing 22, which may have an inner cylindrical surface 23 of a diameter corresponding substantially to the external diameter of the drill bit 11 to be used. Surface 23 is, in one position of the device, centered about axis 15. The outer surface 24 of tube 22 may also be cylindrical, and be concentric with inner surface 23, but be spaced substantially from the inner surface 17 of body 16.

At its lower end, bushing 22 is mounted to body 16 for generally pivotal or swinging movement relative thereto, about essentially a center designated at 25 in FIG. 1. To mount the bushing for this type of movement, I utilize an annular mounting ring 26, formed of an elastomeric material, such as a suitable rubber or an appropriate resiliently deformable resinous plastic material. Ring 26 has an outer cylindrical surface 27 contacting the inner surface 17 of body 16, and has an inner cylindrical surface 28 contacting the outer surface 24 of bushing 22. The ring 26 may be tightly and permanently cemented, vulcanized, or otherwise bonded to elements 16 and 22, annularly and continuously over the entire area of surfaces 27 and 28. If desired, the surfaces of elements 16 and 22 may be knurled or otherwise irregularized at the locations at which they are bonded to ring 26, to assure permanent retention thereto. The ring 26 normally tends by its resilience to return bushing tube 22 to the FIG. 1 position of accurate alignment with axis 15 of body 16.

At the upper end of bushing 22, there is connected to this bushing a circular disc 29 of transparent material, such as a transparent resinous plastic material, which disc has an inner opening 30 disposed about and cemented rigidly to an upper reduced diameter portion 31 of bushing 22. The disc 29 has upper and lower surfaces 32 and 33 which are disposed directly transversely of axis 15 (in the FIG. 1 position of tube 22). At the underside of disc 29, there is formed in surface 33 a circular marking 34, which may be very narrow and give the appearance of a hairline marking as the device is viewed from the upper side of ring 29. Marking 34 may be formed by scribing a circle into the undersurface of disc 29, and filling the scribed circle with black paint or the like. The radial width of the hairline marking 34 is small as compared with the radial width of surface 21 of body 16. In the FIG. 1 position in which elements 16 and 22 are axially aligned and concentric, circular marking 34 is concentric with surface 21, and has a diameter midway between the diameters of the inner and outer surfaces 17 and 18 of body 16, so that the circular marking 34 appears to be midway between the inner and outer extents of surface 21 (see FIG. 2).

In using the drill holder of FIG. 1, the first step is to position body 16 against work surface 14, and in a position such that guide tube 22 is directly over the spot at which the hole is to be drilled in the work piece. While body 16 is manually held in this position, by gripping the body with one hand at the location of knurls or serrations 19, the operator moves drill 12 with his other hand to a position in which bit 11 moves into bushing 22 and against the work piece surface. The portable drill is then energized to commence powered rotation of bit 11, and during such powered rotation the operator continues to hold body 16 with one hand, and holds the drill with the other hand in a position such that the hairline circle 34 appears to be properly centered as shown in FIG. 2 with respect to body surface 21. By maintaining the drill in this position throughout the entire drilling operation, an accurately perpendicular hole is assured, since the transverse end surface 20 of body 16 maintains the body and its axis 15 directly perpendicular to surface 14. It is found that even the slightest variation from proper alignment of ring 34 and surface 21 may be detected relatively easily, and with the device very precisely perpendicular holes may be drilled.

FIGS. 3 and 4 show another form of the invention in which the tubular part 22a removably carries a bushing insert 35 having external threads 36 at its lower end screwed into internal threads 37 formed within part 22a. The upper end of insert 35 may have a flange 38 having serrations 39 by which the part may be manually screwed into and out of element 22a. The inner cylindrical passage 40 within insert 35 is dimensioned to fit a particular drill bit to be utilized with that insert. When other sizes of bits are to be utilized, the liner 35 may be removed from tube 22a, and replaced by another similar insert having a different and appropriate diameter of bit guiding passage.

In FIG. 3, the transparent aiming disc 29a is typically represented as having a partial spherical configuration, to follow more closely the contour of opposed end surface 21a of the body, so that the hairline ring 34a may be as close as possible to surface 21a to attain maximum accuracy of aiming. For gripping body 16a, there may be provided an annular knurled surface 19a, with an annular flange 41 typically being formed at the lower end of the knurls so that a user may exert downward force against flange 41 to facilitate holding of body 16a against the work surface. An annular elastomeric connector and mounting ring 26a mounts part 22a for generally pivotal movement relative to body 16a, and may be suitably cemented, vulcanized or otherwise bonded to parts 16a and 20a. In FIG. 3, body 16a may be a casting of aluminum or other material, and is represented as having a knurled inner surface at 42 to maximize the effectiveness of the bond between ring 26a and body 16a.

The device of FIGS. 3 and 4 is utilized in the same manner as that of FIGS. 1 and 2, except that the drill bit does not directly engage part 22a, but rather engages liner 35, which may as discussed be replaced by any of numerous different sizes of liners having different internal diameters for engaging various sizes of bits.

The tool 10b of FIG. 5 may be considered as very similar to that of FIGS. 3 and 4, except as to the manner in which tube 22b is mounted for pivotal movement relative to outer body 16b. Specifically, I have shown in FIG. 5 a ball and socket type of connection between the parts, illustrated as including an externally spherical enlargement 43 on part 22b, fitting within an internally partial spherical surface 44 formed in outer body 16b. One or both of these ball shaped parts would of course be formed sectionally to enable assembly of the apparatus, but this detail of construction has not been illustrated in FIG. 5. To prevent rotation of inner tubular part 22b relative to body 16b, part 22b may carry a pin 45, screwed into spherical portion 43, and received within an axially elongated slot 46 (FIG. 6) in a side wall of body 16b. As in FIGS. 3 and 4, a series of liners 35b having different internal diameters may be provided, for enabling use of the device with different size bits. The upper transparent aiming disc 29b and its circular hairline marking 34b may be the same as in FIG. 3.

In using the FIG. 5 device, it is manipulated in the same manner discussed in connection with the prior forms, except that the ball and socket joint does not inherently tend to return part 22b and its contained insert to a position of proper alignment with outer body 16b, as do the resilient mounting elements of the first two forms of the invention.

FIG. 7 shows an arrangement which may be considered as substantially the same as that of FIG. 1, except that the resilient pivotal connection which mounts inner tube 22c for pivotal movement about axis 25c relative to outer body 16c consists in this form of simply an O ring 26c, formed of rubber or the like, and received within radially opposed annular grooves 47 and 48 formed in parts 16c and 22c. The grooves may be contoured to fit the O ring, and the latter may be either cemented in place or merely retained in assembled condition by reception within the grooves.

FIG. 8 shows another form of the invention in which a specially shaped resilient ring 26d fits within an annular groove 49 of rectangular cross section formed in the inner surface of outer body 16d, and also fits within an annular groove 50 formed in the outer surface of bushing 22d. The ring engaging surface of part 22d may be annularly serrated or knurled at 51, by serrations preferably extending axially as shown, to prevent rotation of part 22d relative to part 16d. Also, aiming disc 29d may engage and be cemented to or frictionally retained by external serrations 52 formed in the outer surface of the upper portion of part 22d.

In assembling the mounting portion of the FIG. 8 device, a cement may first be applied to the interior of recess 49, following which elastomeric ring 26d may be moved into position within groove 49 into engagement with the cement, to be securely bonded by the cement to part 16d. After this cementing operation, the lower tapered end 53 of tube 22d may be forced downwardly into elastomeric ring 26d, to the illustrated position in which the inner portion of ring 26d is received within groove 50, and the initially cylindrical inner surface of ring 26d engages and is held in tight contact with serrations 51. In this way, the connection between ring 26d and tube 22d may be formed without the use of cement at that location, or if desired cement may be employed.

FIG. 9 shows a final form of the invention which is similar to that of FIG. 8, but which utilizes a ring 26e of the type referred to as a "quad" ring in the trade. This ring is annular and has the illustrated four sided cross section, being defined by arcuately recessed surfaces 54 defining four peaks or corners 55 which fit within the corners of the mating grooves 49e and 50e in the connected outer body part 16e and inner bushing tube 22e. Parts 16e and 22e may be retained in assembled condition with respect to ring 26e merely by virtue of reception of the ring within the grooves, or by an appropriate cement if desired.

I claim:

1. A drill holder comprising a body structure having a positioning surface to be held against an outer surface of a work piece to locate the body structure in a predetermined relation thereto, a guide having a passage for receiving and guiding a drill bit, an elastomeric material mounting said guide to the body structure for swinging movement relative to said body structure between a predetermined drilling position in which the guide is aimed to accurately direct a bit perpendicularly into said work piece surface and other non-perpendicular positions, and means for indicating to a user when said guide is in said perpendicular drilling position.

2. A drill holder comprising a tubular body structure having a positioning end surface to be held against an outer surface of a work piece to locate the body structure in a predetermined relation thereto, a tubular guide within said tubular body structure having a passage for receiving and guiding a drill bit, an elastomeric ring between said tubular body structure and said tubular guide and mounting said guide for swinging movement relative to said body structure between a predetermined drilling position in which the guide is aimed to accurately direct a bit perpendicularly into said work piece surface and other non-perpendicular positions, and means for indicating to a user when said guide is in said perpendicular drilling position.

3. A drill holder comprising a tubular body structure having a positioning end surface to be held against an outer surface of a work piece to locate the body structure in a predetermined relation thereto, a guide within said tubular body structure having a passage for receiving and guiding a drill bit, means mounting said guide for shifting movement relative to said body structure between a predetermined drilling position in which the guide is aimed to accurately direct a bit perpendicularly into said work piece surface and other non-perpendicular positions, a transparent element carried by said guide opposite an outer annular end of said tubular body structure, and an annular marking on said transparent element and receivable opposite and in centered relation with respect to said outer end of the body structure when the guide is in said predetermined position.

4. A drill holder comprising a tubular body structure having a positioning end surface disposed transversely of the axis of said body structure and adapted to be held against an outer surface of a work piece to locate the body structure in a predetermined relation thereto, a tubular guide within said tubular body structure having a passage for receiving and guiding a drill bit, an elastomeric ring radially between said tubular body structure and said tubular guide near said end surface of the body structure and mounting said guide for swinging movement relative to said body structure between a predetermined drilling position in which the guide is centered within and axially aligned with said body structure and aimed to accurately direct a bit perpendicularly into said work piece surface and other non-perpendicular positions, a transparent element carried by said guide opposite an outer annular end of said tubular body structure, and an annular marking on said transparent element and receivable opposite and in centered relation with respect to said outer end of the body structure when the guide is in said predetermined position.

5. A drill holder comprising a body structure having a positioning surface to be held against an outer surface of a work piece to locate the body structure in a predetermined relation thereto, a guide structure having a passage for receiving and guiding a drill bit while the bit turns about a predetermined axis, means mounting said guide structure for shifting movement relative to said body structure between a predetermined drilling position in which the guide structure is aimed to accurately direct a bit perpendicularly into said work piece surface and other non-perpendicular positions, and means for indicating to a user when said guide structure is in said perpendicular drilling position, said last mentioned means including indicator marking means carried by one of said structures and extending essentially about said axis and received in concentric relation with respect to coacting means carried by the other structure in a relation indicating when the guide structure is in said drilling position.

6. A drill holder comprising a body structure having a positioning surface to be held against an outer surface of a work piece to locate the body structure in a predetermined relation thereto, a guide structure having a passage for receiving and guiding a drill bit while the bit turns about a predetermined axis, means mounting said guide structure for shifting movement relative to said body structure between a predetermined drilling position in which the guide structure is aimed to accurately direct a bit perpendicularly into said work piece surface and other non-perpendicular positions, and means for indicating to a user when said guide structure is in said perpendicular drilling position, said last mentioned means including essentially annular indicator means carried by one of said structures and extending essentially about said axis and receivable in concentric adjacent relation with respect to coacting essentially annular means carried by the other structure in a relation indicating when the guide structure is in said drilling position.

7. A drill holder comprising a tubular body structure having a positioning end surface to be held against an outer surface of a work piece to locate the body structure in a predetermined relation thereto, a tubular guide within said tubular body structure having a passage for receiving and guiding a drill bit, means mounting said guide for tilting movement relative to said body structure between a predetermined drilling position in which the guide is centered within and axially aligned with said body structure and aimed to accurately direct a bit perpendicularly into said work piece surface and other non-perpendicular positions, and means for indicating to a user when said guide is in said perpendicular drilling position, said indicating means including essentially annular marking means carried by and movable with said guide and received adjacent an outer end of said tubular body structure in concentric relation with respect thereto when the guide is in said drilling position.

8. A drill holder as recited in claim 7, in which said indicating means include a transparent element disposed about and carried by said guide structure and having said essentially annular marking means formed thereon.

9. A drill holder as recited in claim 8, in which said guide structure swings essentially about a predetermined center relative to said body structure, said transparent element being curved essentially spherically about essentially said center.

10. A drill holder comprising a body structure having a positioning surface to be held against an outer planar surface of a work piece to locate the body structure in a predetermined relation thereto, a guide having a passage for receiving and guiding a drill bit, an essentially universal connection mounting said guide for universal tilting movement relative to said body structure between a predetermined drilling position in which the guide is aimed to accurately direct a bit perpendicularly into said work piece surface and other non-perpendicular positions, and means for indicating to a user when said guide is in said perpendicular drilling position, said guide being constructed and positioned to avoid contact with said outer surface of the work piece in a relation interfering with or preventing said universal movement of the guide when said positioning surface of the body structure is in engagement with said outer surface.

11. A drill holder as recited in claim 10, in which said guide is a tube, and said body structure is a second tube disposed about and having an end portion projecting axially beyond said first mentioned tube and having said positioning surface formed on the extremity of said end portion.

12. A drill holder as recited in claim 10, in which said guide includes an outer tube and a tubular liner bushing removably mounted therein for engaging and guiding the bit.

References Cited by the Examiner

UNITED STATES PATENTS

| | | | |
|---|---|---|---|
| 741,364 | 10/1903 | Ott | 77—62 |
| 889,273 | 6/1908 | Thomas | 77—62 |
| 1,207,717 | 12/1916 | Dartt | 145—129 |
| 2,903,920 | 9/1959 | Blecha | 77—62 |
| 3,086,408 | 4/1963 | Donals | 77—62 |

FRANCIS S. HUSAR, *Primary Examiner.*